(No Model.) 2 Sheets—Sheet 1.

J. DESMOND.
STUMP EXTRACTOR.

No. 262,018. Patented Aug. 1, 1882.

WITNESSES:
Fred. G. Dieterich.
A. M. Long.

INVENTOR.
John Desmond
By Myers & Co
ATTORNEYS.

(No Model.)  2 Sheets—Sheet 2.

J. DESMOND.
STUMP EXTRACTOR.

No. 262,018. Patented Aug. 1, 1882.

WITNESSES:
Fred. G. Dieterich
A. M. Ting

INVENTOR.
John Desmond
By Myers & Co
ATTORNEYS.

UNITED STATES PATENT OFFICE.

JOHN DESMOND, OF JONESVILLE, MICHIGAN.

STUMP-EXTRACTOR.

SPECIFICATION forming part of Letters Patent No. 262,018, dated August 1, 1882.

Application filed March 6, 1882. (No model.)

*To all whom it may concern:*

Be it known that I, JOHN DESMOND, of Jonesville, Hillsdale county, State of Michigan, have invented a new and useful Machine for Pulling or Extracting Stumps from the Ground; and I do hereby declare that the following is a full, clear, and exact description of the construction and operation of the same, reference being had to the annexed drawings, making a part of this specification.

To enable others skilled in the art to make and use my invention, I will proceed to describe its construction and operation.

The nature of this invention consists in the construction of a stump-extractor, substantially as hereinafter more fully set forth, whereby in the use of hydraulic power the piston-rod connected to the stump to be pulled and its cylinder are adapted to adjust themselves to vertical draft applied laterally, and the return of the water after the pumping operation to the tank or reservoir is effected, permitting its reuse for each additional operation, as presently set forth and claimed.

Figure 1:
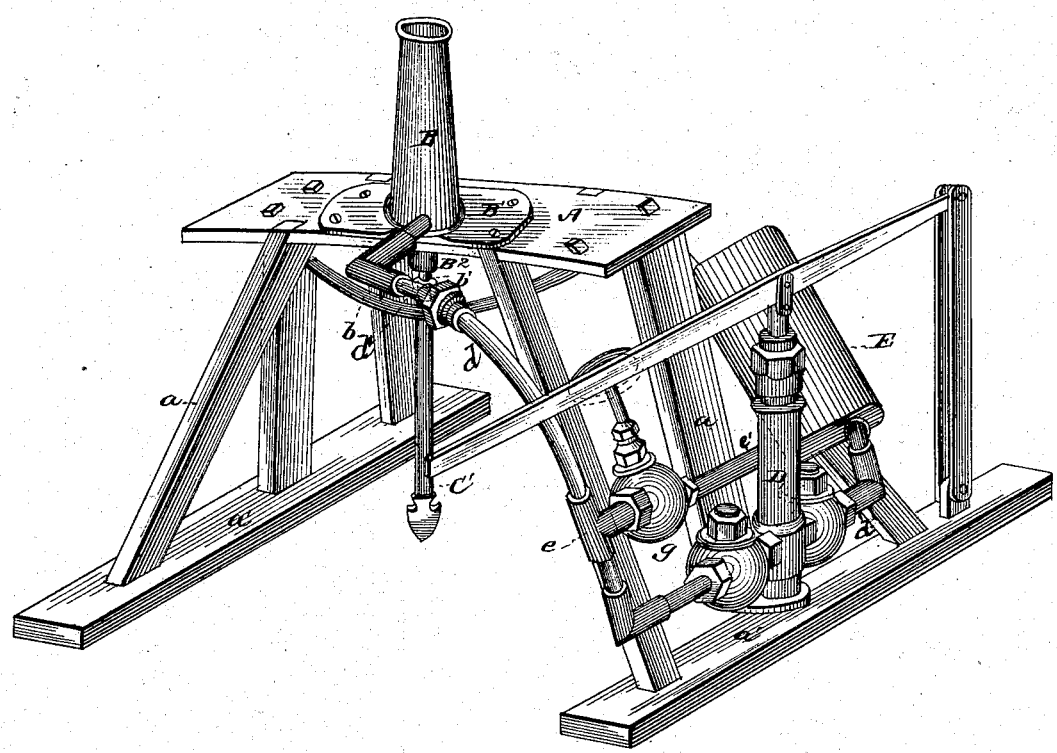
Figure 4:
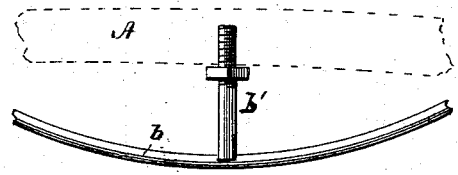
Figure 2:
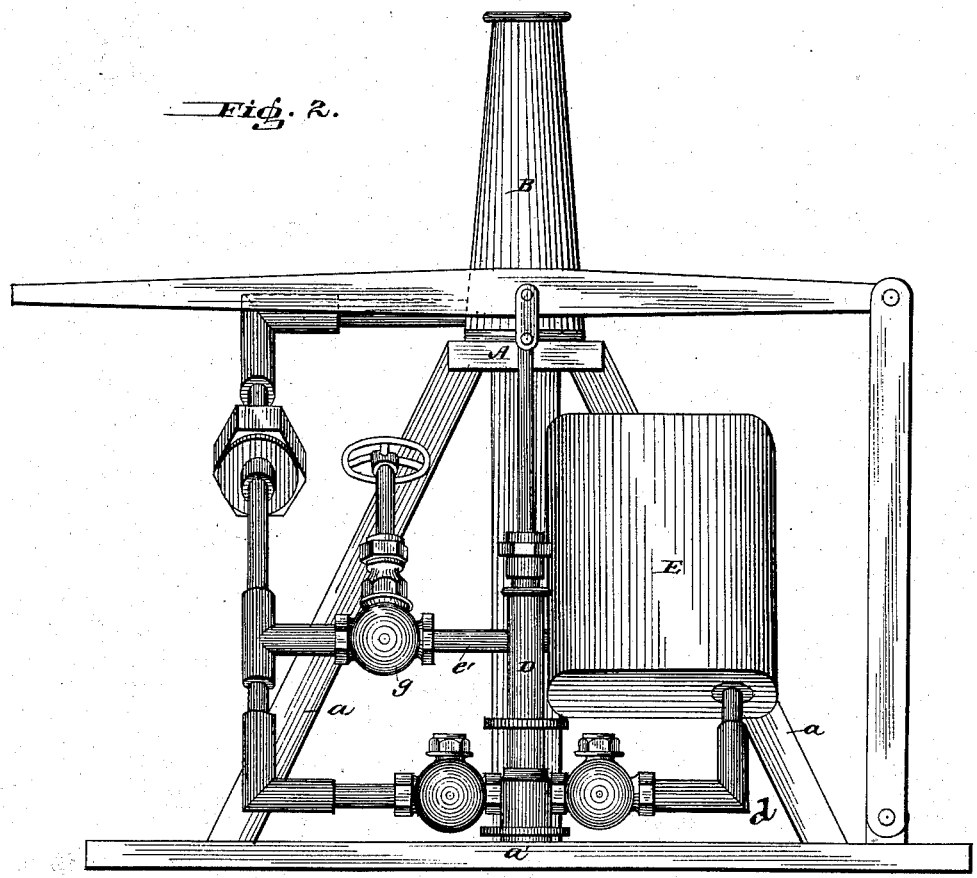
Figure 3:
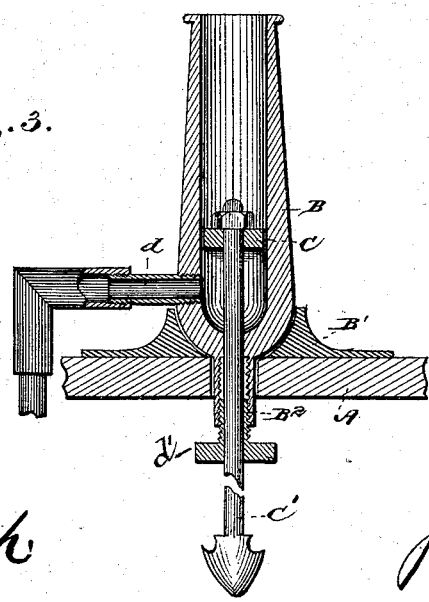

Figure 1 is a view in perspective. Fig. 2 is a side elevation, and Figs. 3 and 4 are detail views.

In carrying out my invention I employ a horizontal, slightly-arched beam, A, secured to and supported upon slantingly-arranged legs $a$, planted or mortised into transverse runners $a'$, which, with a team hitched thereto, permit the transportation of the machine from place to place in the field wherever stumps are to be pulled. The beam A is braced and strengthened by the curved or bowed truss-rods $b$, bolted in the ends of said beam and bearing at the middle against stanchions or rods $b'$, Fig. 4, passing into the beam and capable of being tightened by nuts working on screw-threads thereon and bearing against the under side of the beam.

B is an upright cylinder, having its lower laterally-apertured end rounded or made convex and seated in a concaved or hollowed-out plate or socket, B', having a central aperture through it and bolted to the upper surface of the beam A, the purpose of which is to permit the cylinder and piston-rod passing through it, as presently described, to adjust themselves to the draft or pull to which they may be subjected in pulling the stump. The cylinder B has a tube, $B^2$, on its lower side, arranged in line with its aperture, and on this tube is a screw-thread fitted with a nut, $d'$.

C is the piston, fitted water-tight in the cylinder B and having its rod C' passed down through the aperture and tube $B^2$ of the cylinder, which is suitably adapted to obtain a purchase thereon for the chain or grappling device used to secure a hold upon the stump to be extracted or weight to be elevated.

D is a force-pump supported in position and connected to the legs on one side of the machine and connected by a pipe, $d$, to the bottom of the reservoir or tank E, containing the water. Valves are arranged in this pipe, one on each side of the pump-stock. This pipe is jointed at $e$, and connects with the upright cylinder B at a point just above the "head" or bottom of the cylinder and beneath the piston. It is obvious that as the water is pumped into the cylinder the pressure thereof will act upon and operate the piston, which will elevate the piston-rod and thus effect the pulling of the attached stump.

To permit the reuse of the water after each pulling operation I provide the pipe-joint $e$, connecting the pipe $e'$ therewith, which extends to cock $g$, and ultimately to tank E, the cock $g$ being closed during the pumping operation for pulling the stump, and thereafter opened to pass the water back into the reservoir or tank. This permits the using of the same water over and over until a day's work of pulling stumps has ended, avoiding the refilling of the tank until the machine is no longer required for that day's work.

I claim and desire to secure by Letters Patent—

In a stump-extractor, the combination of the pump D, tank E, and pipes $d$ and $e'$, having cocks and valves, with cylinder B, having a piston and piston-rod, C', substantially as shown and for the purpose described.

Dated February 1, 1882, at Jonesville, Michigan.

JOHN DESMOND.

Witnesses:
CHAS. E. WHITE,
G. G. PEABODY.